Figure 1:
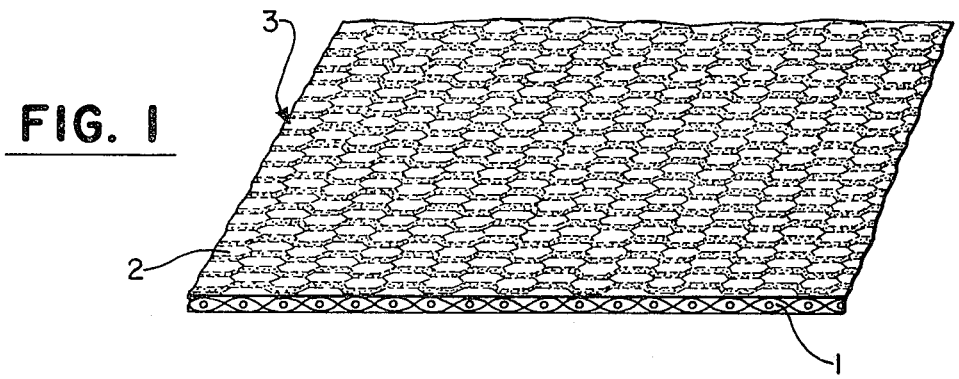

United States Patent [19]

Foti

[11] 3,962,511

[45] June 8, 1976

[54] TEXTILE COMPOSITE STRUCTURE AND METHOD OF PREPARATION

[75] Inventor: Anthony J. Foti, Cuyahoga Falls, Ohio

[73] Assignee: The Goodyear Tire & Rubber Company, Akron, Ohio

[22] Filed: Nov. 21, 1974

[21] Appl. No.: 525,786

[52] U.S. Cl. .................... 428/246; 28/74 R; 74/231 P; 74/232; 156/137; 156/324; 156/308; 156/331; 427/390; 427/434; 428/261; 428/290; 428/286; 428/424

[51] Int. Cl.² .................... B29B 17/00; B29H 7/22; F16G 1/00

[58] Field of Search ........... 156/331, 137, 285, 302, 156/308, 311, 324, 145, 146, 176, 307, 313, 315; 427/207, 390, 412, 434; 428/224, 286, 290, 343, 424, 500, 909, 236, 245, 246, 252, 260, 261, 317, 423, 425; 74/231 P, 232; 28/74 R

[56] References Cited
UNITED STATES PATENTS

| | | | |
|---|---|---|---|
| 1,062,725 | 5/1913 | Mork | 428/245 |
| 2,515,778 | 7/1950 | Knowland | 156/324 |
| 2,706,699 | 4/1955 | Plansoen et al. | 156/324 |
| 3,038,833 | 6/1962 | Glover | 156/324 |
| 3,088,934 | 5/1963 | Bonanni | 156/331 |
| 3,533,834 | 10/1970 | Marzocchi | 427/434 |
| 3,542,617 | 11/1970 | Watson | 428/423 |
| 3,577,295 | 5/1971 | Kraft et al. | 156/324 |
| 3,684,639 | 8/1972 | Keberle et al. | 428/424 |
| 3,687,715 | 8/1972 | Kigane et al. | 428/317 |

*Primary Examiner*—William A. Powell
*Assistant Examiner*—J. J. Gallagher
*Attorney, Agent, or Firm*—F. W. Brunner; H. C. Young, Jr.

[57] ABSTRACT

A textile fabric composite, particularly an industrial belt, prepared by the sequential steps of (A) encapsulating the fibers of a fabric with a polyurethane reaction mixture, (B) drying and at least partially curing said reaction mixture, (C) adhering an overlay of a flexible thermoplastic to one surface of said encapsulated fabric and (D) pressing said thermoplastic into the interstices of said encapsulated fabric under pressure and with the application of heat.

8 Claims, 3 Drawing Figures

U.S. Patent June 8, 1976 3,962,511

TEXTILE COMPOSITE STRUCTURE AND METHOD OF PREPARATION

This invention relates to a composite structure suitable for an industrial belt and to a method of its preparation.

Industrial belts can typically be prepared from textile woven fabrics and used for a variety of industrial purposes such as for driving various gears and pulleys, for transporting various objects such as oil covered metal parts in a manufacturing plant as well as ore and rock in a mining operation. Many times such belts are required to be used under abrasive conditions which tend to excessively wear, cut or break the fibers of the textile fabric and, thus substantially reduce the effective life of the belt itself.

A variety of rubber and thermoplastic materials have been used to protectively coat or encapsulate textile fabric belts to reduce or eliminate the degradative effects of contact with abrasive materials. However, encapsulating a textile fabric with a thermoplastic material has caused serious problems. For example, in order to build up a sufficient belt cover layer of thermoplastic such as one prepared from a liquid polyurethane reaction mixture, the coating of the fabric's individual fibers can be sufficiently thick that they are essentially locked in place. Early failure of such an industrial belt is promoted because the locked fibers tend to fracture or break upon continual flexing of such a belt under tension.

It is therefore an object of this invention to provide an improved thermoplastic encapsulated textile woven fabric suitable for use as an industrial belt.

Figure 2:
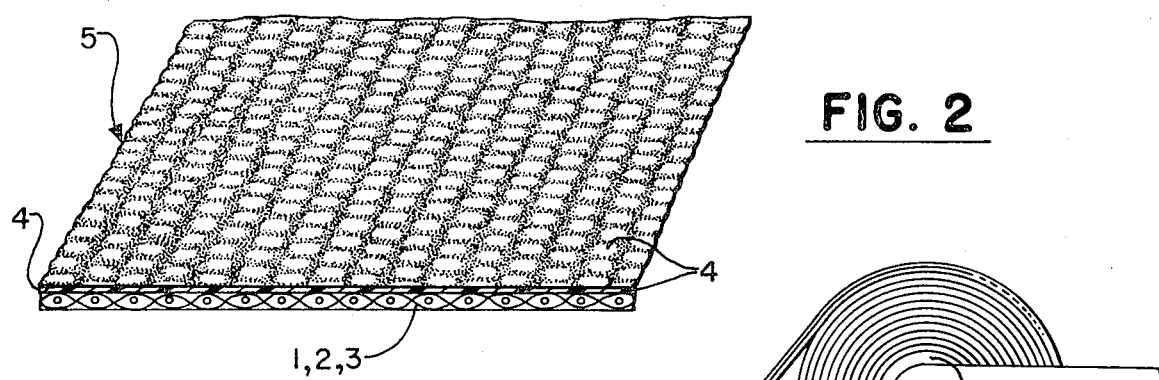
Figure 3:
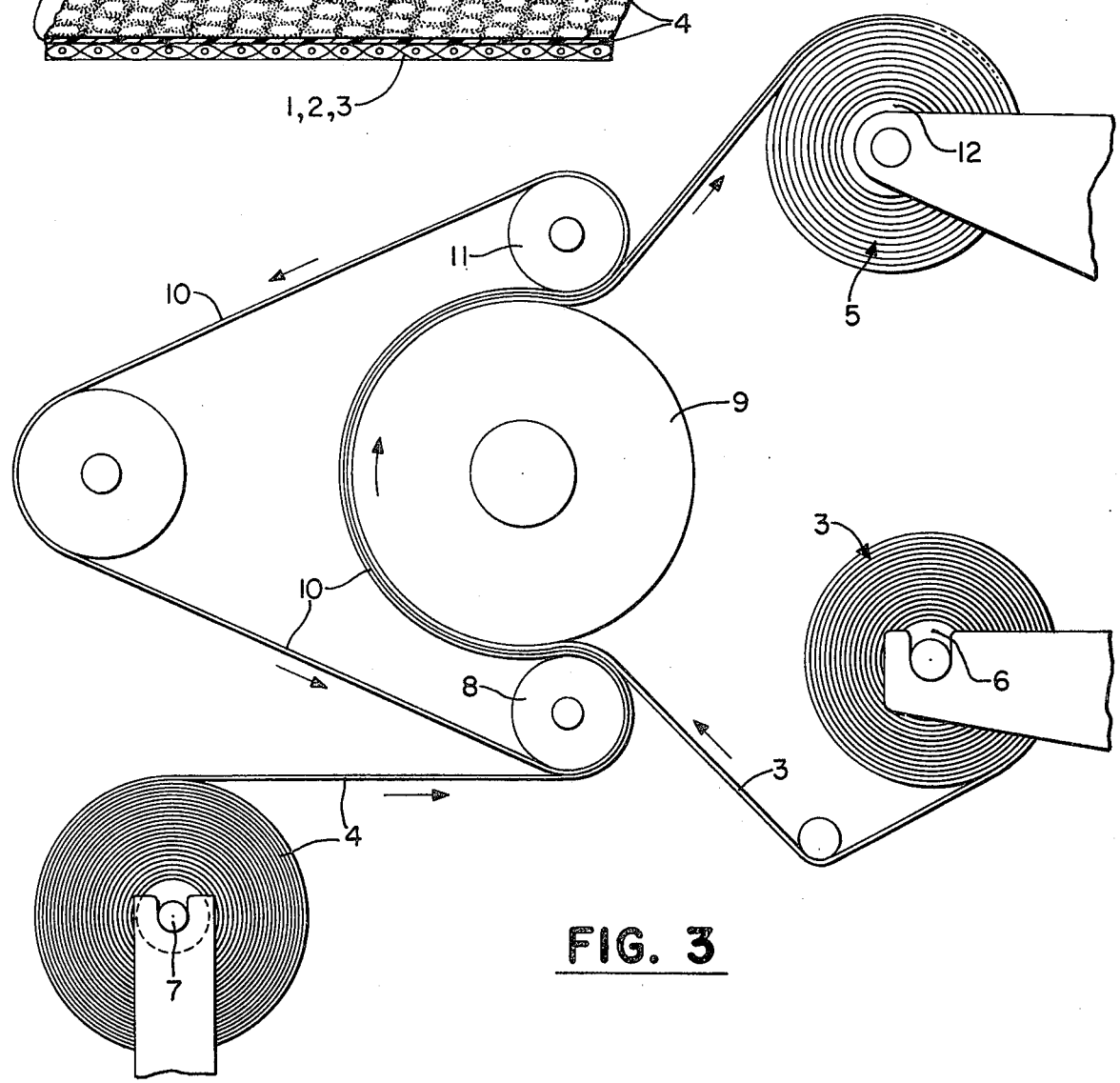

The advantages and objects of this invention may by more readily understood by reference to the drawings in which FIG. 1 is a cross-sectional perspective view of a textile woven fabric belt having a thin encapsulating partially cured dip-coat of a polyurethane thereon, FIG. 2 is a cross-sectional perspective view of the belt of FIG. 1 having a thermoplastic film overlay applied and adhered to said polyurethane dip coat encapsulation and FIG. 3 is a diagramatic view of an apparatus for assembling and manufacturing the belt depicted in FIG. 2.

Reference to the figures shows a textile woven polyester fabric 1 having a weight of about 56 ounces per square yard and a thickness of about 0.17 inch having been previously dipped in a dilute solution of a polyurethane reaction mixture to provide a coating thereon 2 in which about 90 to about 98 percent of the available isocyanate cure sights of said reaction mixture have been cured or reacted, having an average thickness on the fibers of about 0.001 to about 0.005 inch. An encapsulated fabric 3 is thus provided in which at least about 98 percent of its fibers are encapsulated. Indeed, the polyurethane encapsulation is sufficiently thin, on the order of about 1 to 5 mils, that the individual fibers have retained a sufficient amount of their integrity or flexibility that they do not tend to easily break upon repetitive flexing of the fabric under tension. The polyurethane reaction mixture, upon being coated on the textile fabric, is simply allowed to dry and partially cure at a temeprature in the range of about 25°C to about 50°C for about 30 minutes to about 2 hours.

To one side of the encapsulated textile fabric 3 is pressed a thermoplastic film 4 having a thickness in the range of about 10 to about 30 mils with the substantially simultaneous application of heat to the opposite side of the belt to cure the composite in the direction of its inner surface to its outer surface. A composite structure 5, which can be a portion of an industrial belt is thus provided which is thinly encapsulated yet has a substantially thicker adherent protective overlay. The pressure application can be practically instantaneous, such as for a very few seconds, or for a longer period of time if desired. The heat can be applied in the range of about 120°C to about 200°C for a period of about 30 minutes to about an hour.

Indeed, the operation can conveniently be conducted by taking the encapsulated fabric 3 from a let-off roll 6 applying the thermoplastic film 4 from a second let-off roll 7 and feeding the composite directly between a pressure roll 8 and a heating, or curing, roll 9. Generally a pressure in the range of about 10 to about 50 pounds per square inch is required in order to press the thermoplastic film 4 into the interstices of the encapsulated fabric 3 and thereby cause the outer surface of the thhermoplastic to substantially assume the surface definition of the fabric itself. If desired, to facilitate a more efficient preparation process, a second continuous belt 10 can be used onto which the composite can be carried through a combination pressure and heat applying apparatus. In such instance, the continuous belt 10 is allowed to carry the composite through the combination of pressure applying roll 8 and heat applying roll 9 at the point of contact, around the heat applying roll 9 to continue an application of heat for a typical period of about 1 hour and then between a combination of the heat application roll 9 and the second pressure roll 11 to which is again applied a pressure in the range of about 10 to about 50 pounds per square inch. The finished industrial belt is then drawn off the continuous belt and wound up on a wind up roll 12 for storage.

In accordance with this invention, a textile fabric composite structure, suitable for use as an industrial belt, has been discovered which comprises a textile woven fabric having its fibers substantially encapsulated with a thin flexible coat of a cured polyurethane having an average thickness in the range of about 1 to about 5 mils and having a flexible thermoplastic overlay adhered to one surface of said encapsulated fabric with a thickness in the range of about 10 to about 100 mils. Such a composite structure, in accordance with this invention, is prepared by the step wise method which comprises (A) applying a volatile organic solvent solution coat of a polyurethane reaction mixture to a textile woven fabric to substantially encapsulate the fibers of said fabric, (B) drying and at least partially curing said reaction mixture coat to provide a thin flexible polyurethane coat on said fibers having an average thickness in the range of about 1 to about 5 mils, (C) adhering an overlay of a flexible thhermoplastic film, having a thickness in the range of about 10 to about 100 mils, to one surface of said encapsulated fabric and (D) pressing said thermoplastic into the interstices of said encapsulated fabric with a pressure in the range of about 10 to about 50 pounds per square inch, and applying heat from the encapsulated fabric side of the composite opposite its overlay surface to cure the encapsulating polyurethane and to adhere said flexible overlay.

Various fabrics can be used for the textile woven substrate, or belt of this invention produced from various yarns and from various filaments by processes known in the art. Fabrics prepared from polyamides and polyaramides such as nylon, from polyesters, from cellulose and cellulose derivatives such as cotton and rayon, from wire and from glass are particularly useful. Generally fabrics prepared from the polyamides, polyesters and rayon are preferred. A desirable fabric for the purpose of this invention is generally desired to be of an interwoven or multiple warp single ply structure having a thickness in the range of about 0.1 to about 0.4 inch and having a weight of about 30 to about 130 ounces per yard or higher.

In the practice of this invention, it is necessary to first encapsulate the fibers of the textile fabric with a polyurethane coat sufficiently thin so that the fibers themselves retain sufficient flexibility or mobility that they will not tend to break as the belt itself is forced to bend around various rollers in a continuous process. For this purpose, it is preferably required that the textile woven fabric is at least 90 percent, and more preferably at least about 98 percent, encapsulated and that the coating itself has a thickness in the range of about 1 to about 5 mils on the fibers. The requirement for encapsulation of the fibers is based both upon the enhancement of abrasion resistance and, of typically equal importance, a requirement that the fabric itself will not appreciably absorb liquids such as oils which may be contained in products desired to be transported by the belt.

For the purpose of encapsulating the textile woven fabric, the fabric itself is simply coated such as by dipping, although other techniques such as spraying, spreading or casting might be used, into a dilute polyurethane reaction mixture. It is generally preferred tthat the polyurethane reaction mixture be diluted to an extent of about 15 to about 25 percent by weight solids based on the polyurethane and organic solvent.

Various nonreactive solvents known to those skilled in the polyurethane art can be used for the preparation of the prepolymer solutions and polyurethane reaction mixtures, if a solvent is desired. Representative examples of the solvents are aromatic solvents such as benzene, xylene and toluene; and the liquid lower ketones such as acetone, methyl ethyl ketone, methyl isobutyl ketone and diisobutyl ketone. If the polyurethane reaction mixtures are to be useed to prepare the cured polyurethanes in confined areas which are subject to explosive hazards, nonflammable chlorinated solvents can be used to form nonflammable polyurethane reaction mixtures. Mixtures of solvents may also be used to obtain satisfactory spreading properties and evaporation rates when the polyurethane spray composition is applied to a polymeric surface.

If desired, pigments, carbon black, surface-active agents, leveling agents, such as cellulose acetate butyrate, and other additives can be added. When a pigment is added, it is added in an amount from about 0.5 to 10 parts and, preferably usually in the amount from about one to two parts of pigment per hundred parts of polymer by weight.

Generally, the dipping or coating of the fabric is conducted over a very short period of time to prevent an excessive thickness or build up of the coating to occur. In this respect, the time and temperature of the dip or coating operation itself will have to be determined by one having skill in the art, although, for example, dip time of about 1 to 5 seconds at a temperature of about 20°C to about 30°C may be generally satisfactory depending somewhat on the polyurethane mixture itself.

The encapsulated fabric is then at least partially cured to secure the coat onto the fibers. In this regard, it is particularly desired that the reaction mixture is at least partially cured to an extent of about 95 to about 98 of its available isocyanate or hydroxyl cure sights are reacted. Such cure sights are identified by the excess of isocyanate groups of hydroxyl groups of polymeric polyols over the total of such groups taken in the absence of an extra curative such as a primary diamine or hydrocarbon diol.

A thin layer, or overlay, of flexible thermoplastic material is then applied to one surface of the encapsulated fabric. It is generally desired that the thermoplastic film have a thickness in the range of about 10 to about 100 mils and more preferably about 10 to about 50 mils. Various thermoplastic films can be used representative of which are polyethylene, polypropylenee and polyurethane. Generally a cured polyurethane is preferred because of its tendency to have an enhanced affinity for the partially cured polyurethane encapsulated fabric itself.

In the practice of this invention, the thermoplastic film or overlay, is applied to one surface of the partially cured polyurethane encapsulated fabric and is essentially simultaneously both pressed into the interstices of the fabric itself with a pressure in the range of about 20 to about 70, preferably about 30 to about 60, pounds per square inch while applying heat at a temperature in the range of about 100°C to about 200°C, preferably about 120°C to about 150°C, to the surface of the encapsulated fabric opposite the applied thermoplastic film.

Generally the pressure is applied in a continuous process essentially instantaneously, or over a period of about 1 to about 5 seconds whereas, it is generally desired to continue to apply the heat over a longer period of time such as from about 1 minute to about 30 minutes or more in order to more properly affect a final curing of the polyurethane encapsulation and to affect a more secure bonding of the thermoplastic film to the encapsulated fabric.

In the practice of this invention, a suitable polyurethane for the encapsulation of the textile woven fabric, preferably woven with spun yarn, and for the adherent polyurethane overlay may be prepared by reacting an organic diisocyanate, a polymeric polyol having an hydroxyl functionality of about 2 and a molecular weight in the range of about 700 to about 5000 and if desired and preferably, at least one curative selected from primary diamines and from monomeric hydrocarbon diols having from 2 to 6 carbon atoms, where the ratio of the isocyanato groups of the polyisocyanate to the reactive hydrogens of the reactive hydrogen-containing polymeric material is from about 0.8/1 to about 3.5/1, preferably to about 2/1, and where the ratio of amino groups and hydroxyl groups of the curative to isocyanato groups in excess of the reactive hydrogens of the reactive hydrogen-containing polymeric material is from about 0.7/1 to about 1.1/1.

Where it is desired that the primary curative is both the monomeric diol and the primary diamine, it is preferred that they are added together, preferably as a mixture.

It is typically preferred that the cured polyurethane composition is prepared (A) by the method which comprises (1) preparing an isocyanate terminated polyurethane prepolymer by reacting the organic diisocyanate with the polymeric polyol, and curing said prepolymer, preferably with said primary diamine or said hydrocarbon diol, (B) by the one-shot method of mixing all the components essentially at once, or (C) by the quasi-prepolymer method which comprises first preparing a prepolymer of said polyisocyanate with said polymeric polyol with a substantial excess of polyisocyanate and then reacting the remainder of materials.

In the practice of this invention, although it is possible to prepare the polyurethane composition in the absence of solvents, it is generally preferred that the composition is prepared by mixing in solution a polyurethane prepolymer and the curative, especially for the purpose of fiber encapsulation where the textile fabric can be dipped therein followed by substantially simultaneously removing the solvent from the mixture and curing the polyurethane.

Thus, the polyurethane reaction mixtures used in this invention are typically liquid mixtures commonly used to prepare flexible polyurethanes by the well-known one-shot, prepolymer or quasi-prepolymer techniques. The materials are typically reacted at temperatures from about 20°C to about 200°C and usually from about 20°C to about 100°c or 150°C.

A catalyst or accelerator can be used to facilitate the reaction which results in substantially reduced set-up time, and thus enhances the thixotropic properties of the polyurethane mixture. Well-known polyurethane catalysts are useful for this purpose such as tertiary amines and the tin salts of fatty acids and also accelerators such as mercaptobenzothiazole.

A particularly suitable thermoplastic polyurethane can be prepared simply by reacting a mixture of polymeric diol, hydrocarbon monomer diol, diisocyanate and sulfone diamine, if desired, to form a loosely cured but soluble polyurethane. Such a polyurethane can then conveniently be used in solution as a dip or as a coating mixture.

The polymeric polyol typically comprises at least one member selected from the group consisting of polyester polyols, polyether polyols, and hydroxyl-terminated unsaturated polymeric polyols. The hydroxyl-terminated unsaturated polymeric polyols typically have a molecular weight of from about 2000 to about 4000 and a hydroxyl functionality of about 2. The reactive hydrogen-containing material generally used, other than the hydroxyl-terminated unsaturated polymeric polyol, has a molecular weight in the range of from about 700 to about 5000, and usually from about 1000 to about 3000. (If the molecular weight of the reactive hydrogen-containing material is too low, the polyurethane will not have sufficient elasticity.) Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid and azelaic acid. The anhydrides of such acids can be used in place of the acid.

Further examples of polyesters are caprolactone polyesters. The caprolactone polyesters are substantially linear, hydroxyl-terminated polymers prepared by reacting a caprolactone having 6 to 8 carbon atoms, preferably 6 carbon atoms, with a glycol having 4 to 7 carbon atoms and preferably 4 to 6 carbon atoms. Various suitable caprolactones include ε-caprolactone, zeta-caprolactone and eta-caprolactone. Alkyl substituted caprolactones can be used with alkyl substitutents containing 1 to 2 carbon atoms selected from methyl and ethyl radicals such as methyl ε-caprolactone. Desirably, the caprolactone polyester has a molecular weight in the range of about 800 to about 2200, preferably about 1200 to about 2100, with corresponding hydroxyl numbers in the range of about 140 to about 45 and about 95 to about 55 respectively.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low molecular weight gylcols, or by the reaction of one or more such alkylene oxidees with the glycols or with triol, or with a polycarboxylic acid such as phthalic acid. The polyether polyols include polyalkylenearyl ethyl glycols or triols, polytetramethylene ether glycols, polyalkylene ethertrioether glycols or triols and alkyd resins. Generally the polytratramethylene ether glycols are the preferred polyether glycols.

It is usually preferred that the hydroxyl-terminated unsaturated polymeric polyol has a molecular weight of from about 2000 to about 4000 and a corresponding hydroxyl number of from about 50 to about 25. The hydroxylterminated unsaturated polymeric polyols used in this invention are unsaturated polymers of the type prepared by polymerizing unsaturated monomers comprising from about 70 to about 100 percent conjugated dienes selected from the group consisting of 1,3-butadiene and isoprene and up to about 30 percent styrene with the aid of orgainc peroxy catalysts to provide polymers which are generally terminated at both ends of their chain with hydroxyl groups and can have a hydroxyl functionality of from about 2 to about 2.3 although usually from about 2 to about 2.1. The preferred hydroxyl-containing polymeric polyols are polybutadiene polyols polyisoprene polyols, butadiene-styrene copolymer polyols having about 70 to 90 percent units derived from butadiene and about 30 to 10 percent units derived from styrene and also butadiene-acrylonitrile copolymer polyols.

The organic diisocyanates used in this invention include various organic diisocyanates and mixtures thereof. The organic diisocyanates can be aromatic, aliphatic or cycloaliphatic or combinations of these types.

Representative examples of such diisocyanates include the toluene diisocyanates, m-phenylene diisocyanate, 4-chloro-1,3-phenylene diisocyanate, 1,4'-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate), 3,3'-dimethyl-4,4'-diphenylmethane diisocyanate and 1,5-tetrahydronaphthalene diisocyanate and 2,2,4-trimethyl hexamethyl diisocyanate and mixtures of such diisocyanates. For the purposes of the present invention, the toluene diisocyanates, diphenylmethane-4,4'-diisocyanate, 3,3'-dimethyl-4,4'-bisphenylene diisocyanate, 4,4'-methylene-bis(cyclohexylisocyanate) and 3,3'-dimethyl-4,4'-diphenylmethane diisocyanate are preferred. For convenience, these diisocyanates are referred to as TDI, MDI, TODI, $H_{12}$MDI and DMMDI, respectively.

The curatives promote chain extension and crosslinking of the polyurethane polymer. Bifunctional materials such as glycols and diamines are generally preferred as chain extending and crosslinking agents. Representative examples of such curatives are hydrocarbon diols such as ethylene glycol, 1,3-propanediol, 1,4-butanediol, 1,5-pentanediol, 1,6-hexanediol and glycerol; aliphatic diamines such as ethylene diamine, trimethylene diamine, 1,4-cyclohexane bis(methylamine), [3,5,5-trimethyl-3-aminomethyl cyclohexylamine], and tetramethylene diamine; aromatic diamines such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, 2,2'-diamino-diphenyl disulfide and 4,4'-diamino-diphenyl disulfide, the naphthylene diamines, tolylene-2,4-diamine, 4,4-diaminodiphenyl sulfone and o- and p-aminodiphenylamine; hydroxy amines such as triethanol amine, diglycol amine, 2-amino-ethyl alcohol, 2-amino-1-naphthol and m-aminophenol; hydroxy carboxylic acids such as glycolic acid and alpha-hydroxy propionic acid; and amino carboxylic acids such as amino acetic acid and amino benzoic acid. The preferred cross-linking agents are the aromatic diamines, aliphatic diamines and hydroxy amines as well as hydrocarbon diols such as 1,4-butane diol.

The practice of this invention is further illustrated by reference to the following example which is intended to be representative rather than restrictive of the scope of the invention. Unless otherwise indicated, all parts and percentages are by weight.

EXAMPLE I

A multiple warp single ply spun polyester textile woven fabric, having a weight of about 56 to 57 ounces per squared yard, a thickness of about 0.17 inch and a width of about 6 inches was fed from a let off roll through a dip tank containing a solution of polyurethane reaction mixture at a temperature of about 25°C. The solution itself comprised about 80 percent methyl ethyl ketone solvent and, correspondingly, about 20 percent polyurethane reaction materials. The residence time of the fabric within the dip was about three seconds. The dip solution absorbed into the fabric itself thereby encapsulating the various fibers to an extent of at least 98 percent and, by visual observation, essentially 100 percent.

The encapsulated fabric was allowed to air cure for about 2 hours at about 25°C to essentially dry the encapsulating polyurethane reaction mixture and to at least partially cure the mixture to an estimated extent of about 80 to about 95 percent of its cure sights being reacted. The encapsulated fabric was rolled onto a second let off roll with a polyethylene film being placed between the layers of the roll to prevent the polyurethane from sticking to itself.

The encapsulated fabric was fed from the second let off roll under a tension of about 200 pounds across the width while feeding from a third let off roll a film of flexible cured polyurethane having a thickness of about 20 mils and width of about 7 inches onto the top surface of the encapsulated fabric to form a composite structure. The composite was fed between an upper pressure roll having a diameter of 8 inches and a lower heating roll having a diameter of 12 inches at a rate of about 4 inches per minute. The pressure roll applied pressure against the cured polyurethane film through the composite to the heating roll, to press the film onto the interstices of the fabric and cause the film itself to substantially assume the surface definition of the fabric itself. The heated roll applied heat to the opposite surface of the encapsulated fabric at a temperature of about 180°C in a manner similar to that shown in FIG. 3 of the drawings to cure the encapsulating polyurethane from the inside fabric surface outwardly to its its overlay surface and to adhere the pressed polyurethane overlay. The composite was allowed to remain in contact with the heating roll for about 300° of its circumference as it revolved and was caused to maintain contact with the heating roll until it reached the bottom portion where it was passed between said heating roll and a second pressure roll from which pressure of about 200 pounds across the width was again applied to the composite through the cured polyurethane film to enhance the adherence and shaping of the polyurethane overlay into fabric interstices. The composite structure, in this procedure, was allowed to remain in contact with the heating roll for about 6 to 8 minutes during the time it passed between the first and second pressure rolls. Following its exit from the second pressure roll, the composite encapsulated fabric structure was simply wound up on a suitable wind-up roll and stored for use as an industrial belt.

While certain representative embodiments and details have been shown for the purpose of illustrating the invention, it will be apparent to those having skills in this art that various changes and modifications may be made therein without departing from the spirit or scope of the invention.

What is claimed is:

1. A method of preparing a textile fabric composite structure which comprises the sequential steps of (A) applying a volatile organic solvent solution coat of a polyurethane reaction mixture to a textile woven fabric to substantially encapsulate the fibers of said fabric, (B) drying and at least partially curing said reaction mixture to provide a thin flexible polyurethane coat on said fibers having an average thickness in the range of about 1 to about 5 mils, (C) adhering an overlay of a flexible thermoplastic film, having a thickness in the range of about 10 to about 100 mils, to one surface of said encapsulated fabric and (D) pressing said thermoplastic into the interstices of said encapsulated fabric with a pressure in the range of about 10 to about 50 pounds per square inch, and applying heat from the encapsulated fabric side of the composite opposite its overlay surface to cure the encapsulating polyurethane and adhere said flexible overlay.

2. A textile fabric composite structure prepared by the method of claim 1.

3. The method of claim 1 where said textile fabric is prepared from yarns of polyamides, polyaramides, polyesters, cotton, rayon, wire and glass.

4. The method of claim 3 where said textile fabric is of an interwoven or multiple warp single ply structure having a thickness in the range of about 0.1 to about 0.4 inch and having a weight of about 30 to about 130 ounces per square yard prepared from yarns selected from polyamides, polyesters, and rayon and where said thermoplastic overlay is selected from films of polyethylene, polypropylene and polyurethane.

5. The method of claim 4 where said textile fabric is at least about 98 percent encapsulated with said polyurethane which is first partially cured to an extent of at least about 95 percent of its available cure sites having reacted, following which a thermoplastic polyurethane overlay having a thickness in the range of about 10 to about 100 mils is pressed into the interstices of said encapsulated fabric with a pressure in the range of about 20 to about 70 pounds per square inch and heat is applied at a temperature in the range of about 100°C to about 200°C to the surface of the encapsulated fabric opposite said overlay.

6. An industrial belt prepared by the method of claim 5.

7. The method of claim 5 where said encapsulation and overlay is a polyurethane individually prepared from a diisocyanate, a polymeric polyol having a hydroxyl functionality of about 2 and a molecular weight in the range of about 700 to about 5000 and at least one curative selected from primary diamines and hydrocarbon diols having 2 to 6 carbon atoms, where the ratio of the isocyanato groups of the polyisocyanate to the reactive hydrogens of the reactive hydrogen-containing polymeric material is from about 1/1 to about 3.5/1 and where the ratio of amimo groups and hydroxyl groups of the curative, when used, to isocyanato groups in excess of the reactive hydrogens of the reactive hydrogen-containing polymeric material is from about 0.7/1 to about 1.1/1.

8. A textile fabric composite structure prepared by the method of claim 7.

* * * * *